(12) United States Patent
Furumura

(10) Patent No.: US 7,063,591 B2
(45) Date of Patent: Jun. 20, 2006

(54) EDIT DEVICE, EDIT METHOD, AND RECORDED MEDIUM

(75) Inventor: Kyoko Furumura, Tokyo (JP)

(73) Assignee: Sony Corporation, Tokyo (JP)

( * ) Notice: Subject to any disclaimer, the term of this patent is extended or adjusted under 35 U.S.C. 154(b) by 1128 days.

(21) Appl. No.: 09/914,453

(22) PCT Filed: Dec. 28, 2000

(86) PCT No.: PCT/JP00/09417

§ 371 (c)(1),
(2), (4) Date: Aug. 27, 2001

(87) PCT Pub. No.: WO01/49461

PCT Pub. Date: Jul. 12, 2001

(65) Prior Publication Data

US 2002/0137425 A1    Sep. 26, 2002

(30) Foreign Application Priority Data

Dec. 29, 1999  (JP)  ................................ 11-377257

(51) Int. Cl.
*A63H 29/00* (2006.01)
(52) U.S. Cl. .................... 446/484; 446/330; 446/297
(58) Field of Classification Search ................ 446/175, 446/484, 297–303, 330, 354, 319
See application file for complete search history.

(56) References Cited

U.S. PATENT DOCUMENTS

| 4,923,428 A * | 5/1990 | Curran ........................ 446/175 |
| 6,012,961 A * | 1/2000 | Sharpe et al. ............... 446/298 |
| 6,253,058 B1 * | 6/2001 | Murasaki et al. ........... 434/308 |
| 6,290,566 B1 * | 9/2001 | Gabai et al. ................ 446/175 |
| 6,394,872 B1 * | 5/2002 | Watanabe et al. ........... 446/175 |
| 6,565,407 B1 * | 5/2003 | Woolington et al. ........ 446/175 |

FOREIGN PATENT DOCUMENTS

| JP | 8-194517 | 7/1996 |
| JP | 9-269812 | 10/1997 |

* cited by examiner

*Primary Examiner*—Kien Nguyen
(74) *Attorney, Agent, or Firm*—Frommer Lawrence & Haug LLP; William S. Frommer

(57) ABSTRACT

In the case where the user's approach is always the same, a robot device performs the same actions and shows the same growth, and there is a problem that the user gets tired of the robot device. In an editing apparatus and an editing method, the action of the robot device which acts in accordance with the predetermined behavioral model is visibly displayed, and the behavioral model which is visibly displayed is edited by the user's operation. Also, in an editing apparatus and an editing method, the growth of the robot device which grows up in accordance with the predetermined growth model is visibly displayed, and the growth model which is visibly displayed is edited by the user's operation.

4 Claims, 12 Drawing Sheets

FIG. 7

| | INPUT EVENT NAMES | DATA NAMES | DATA EXTENTS | A | B | C | D | n |
|---|---|---|---|---|---|---|---|---|
| | | | | NODE TRANSITED TO → | | | | |
| node 100 | | | | node 120 | node120 | node 1000 | ~ | node 600 |
| | | | | ACTION 1 | ACTION 2 | MOVE BACK | ~ | ACTION 4 |
| 1 | BALL | SIZE | 0, 1000 | 30% | | | | |
| 2 | PAT | | | | 40% | | | |
| 3 | HIT | | | | 20% | | | |
| 4 | MOTION | | | | | | | |
| 5 | OBSTACLE | DISTANCE | 0, 100 | | | | | |
| 6 | | JOY | 50, 100 | | | 50% | | |
| 7 | | SUPRISE | 50, 100 | | | 100% | | |
| 8 | | SADNESS | 50, 100 | | | | | |

Top bracket over A–n: TRANSITION PROBABILITIES TO ANOTHER NODE

Left brackets: NODE TRANSITED TO / OUTPUT ACTION

50

EDIT DEVICE, EDIT METHOD, AND RECORDED MEDIUM

FIELD OF THE ART

This invention relates to an editing apparatus, an editing method and a recording medium, and is applicable to an editing apparatus, an editing method and a recording medium for editing the growth model and/or the behavioral model of a pet robot, for example.

BACKGROUND ART

Recently, a four-leg walking pet robot which acts in accordance with the user's command and surrounding environment has been proposed and developed by the patent applicant(s) of this invention. The pet robot has the shape like a dog or a cat had in a common home, and autonomically acts in accordance with the user's command and surrounding environment. Note that the assembly of movements is defined as an action to be used hereinafter.

Moreover, the patent applicant(s) of this invention has proposed the method of improving the sense of amusement as a pet robot in such a way that the "growth" function is provided in the pet robot, like a real dog or cat, to give an user the sense of affinity and feeling of satisfaction (Japanese Patent Application No. 129276/1999).

However, in the pet robot which has been disclosed in the Japanese patent application No. 129276/1999, since the level of difficulty or complication in the actions and movements expressed (hereinafter, this is referred to as growth level) is only raised up in stages, there is a problem that a user becomes accustomed to the actions and movements of the pet robot and gets tired of them, for example, in the case where the pet robot has been "grown up" or in the case where there is a long term before the next "growth".

Also, since the pet robot determines the actions and movements in accordance with the predetermined program, a plurality of pet robots which are in the same growth stage perform the same actions and movements, for example, when the commands given by a user and surrounding environment are same. Thereby, it is difficult to grow up the pet robot performing the actions and movements specific to the user.

Accordingly, in the pet robot, if the above problems can be solved, it can be considered that the user does not get tired of the pet robot and the sense of amusement is further improved.

DISCLOSURE OF THE INVENTION

Considering the above points, this invention provides an editing apparatus, an editing method and a recording medium that can improve the sense of amusement remarkably.

To solve the above problem, according to this invention, the editing apparatus comprises display means for visibly displaying the predetermined behavioral model of a robot device which acts in accordance with the behavioral model, and editing means for editing the behavioral model which is visibly displayed, in accordance with the user's operation.

As a result, the editing apparatus edits the behavioral model of the robot device into the behavioral model specific to the user, and makes the robot device act specific to the user so as to provide the user's own characteristics different from other robot devices. This effectively prevents that the user gets tired of the actions of the robot device. Thus, an editing apparatus capable of further improving the sense of amusement can be accomplished.

Furthermore, according to this invention, the editing apparatus comprises: display means for visibly displaying the predetermined growth model of a robot device which grows up in accordance with the growth model; and editing means for editing the growth model which is visibly displayed, in accordance with the user's operation.

As a result, the editing apparatus edits the growth model of the robot device into the growth model specific to the user, and makes the robot device grow up specific to the user so as to provide the user's own characteristics different from other robot devices. This effectively prevents that the user gets tired of the growth of the robot device. Thus, an editing apparatus capable of further improving the sense of amusement can be accomplished.

Furthermore, according to this invention, the editing method comprises: the first step of visibly displaying the predetermined behavioral model of a robot device which acts in accordance with the behavioral model; and the second step of editing the behavioral model which is visibly displayed, in accordance with the user's operation.

As a result, the editing method edits the behavioral model of the robot device into the behavioral model specific to the user, and makes the robot device act specific to the user so as to provide the user's own characteristics different from other robot devices. This effectively prevents that the user gets tired of the actions of the robot device. Thus, an editing method capable of further improving the sense of amusement can be accomplished.

Furthermore, according to this invention, the editing method comprises: the first step of visibly displaying the predetermined growth model of a robot device which grows up in accordance with the growth model; and the second step of editing the growth model which is visibly displayed, in accordance with the user's operation.

As a result, the editing apparatus edits the growth model of the robot device into the growth model specific to the user, and makes the robot device grow up specific to the user so as to provide the user's own characteristics different from other robot devices. This effectively prevents that the user gets tired of the growth of the robot device. Thus, an editing method capable of further improving the sense of amusement can be accomplished.

Furthermore, according to this invention, a program for performing the editing processing is stored in the recording medium, the program comprising: display step of visibly displaying the predetermined behavioral model of a robot device which acts in accordance with the behavioral model; and editing step of editing the behavioral model which is visibly displayed, in accordance with the user's operation.

As a result, the program stored in the recording medium edits the behavioral model of the robot device into the behavioral model specific to the user, and makes the robot device act specific to the user so as to provide the user's own characteristics different from other robot devices. This effectively prevents that the user gets tired of the actions of the robot device. Thus, a recording medium capable of further improving the sense of amusement can be accomplished.

Furthermore, according to this invention, a program for performing the editing processing is stored in the recording medium, the program comprising: display step of visibly displaying the predetermined growth model of a robot device which grows up in accordance with the growth model; and editing step of editing the growth model which is visibly displayed, in accordance with the user's operation.

As a result, the program stored in the recording medium edits the growth model of the robot device into the growth model specific to the user, and makes the robot device grow up specific to the user so as to provide the user's own characteristics different from other robot devices. This effectively prevents that the user gets tired of the growth of the robot device. Thus, a recording medium capable of further improving the sense of amusement can be accomplished.

BRIEF DESCRIPTION OF DRAWINGS

FIG. 7 is a conceptual diagram showing the state transition table.

BEST MODE FOR CARRYING OUT THE INVENTION

This invention will be described in detail with reference to the accompanying drawings.

(1) Construction of Pet Robot (1-1) General Construction of Pet Robot

Figure 1:
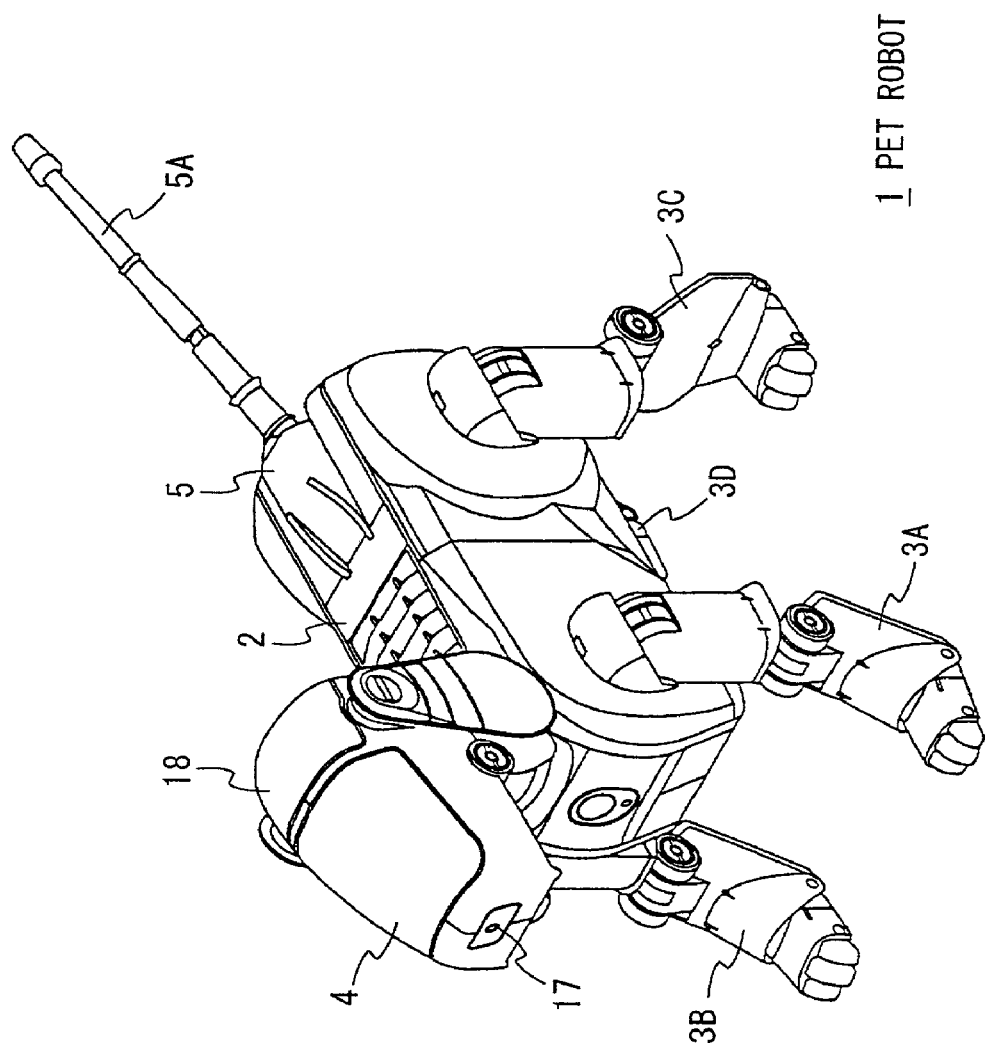
FIG. 1 is a perspective view showing the outline constitution of a pet robot.

Referring to FIG. 1, a reference numeral 1 generally shows a pet robot, which is constructed by joining leg units 3A to 3D to the back and forth sides, and the right and left sides of a body unit 2 respectively, and by joining a head unit 4 and a tail unit 5 to the front end and back end of the body unit 2 respectively.

Figure 2:
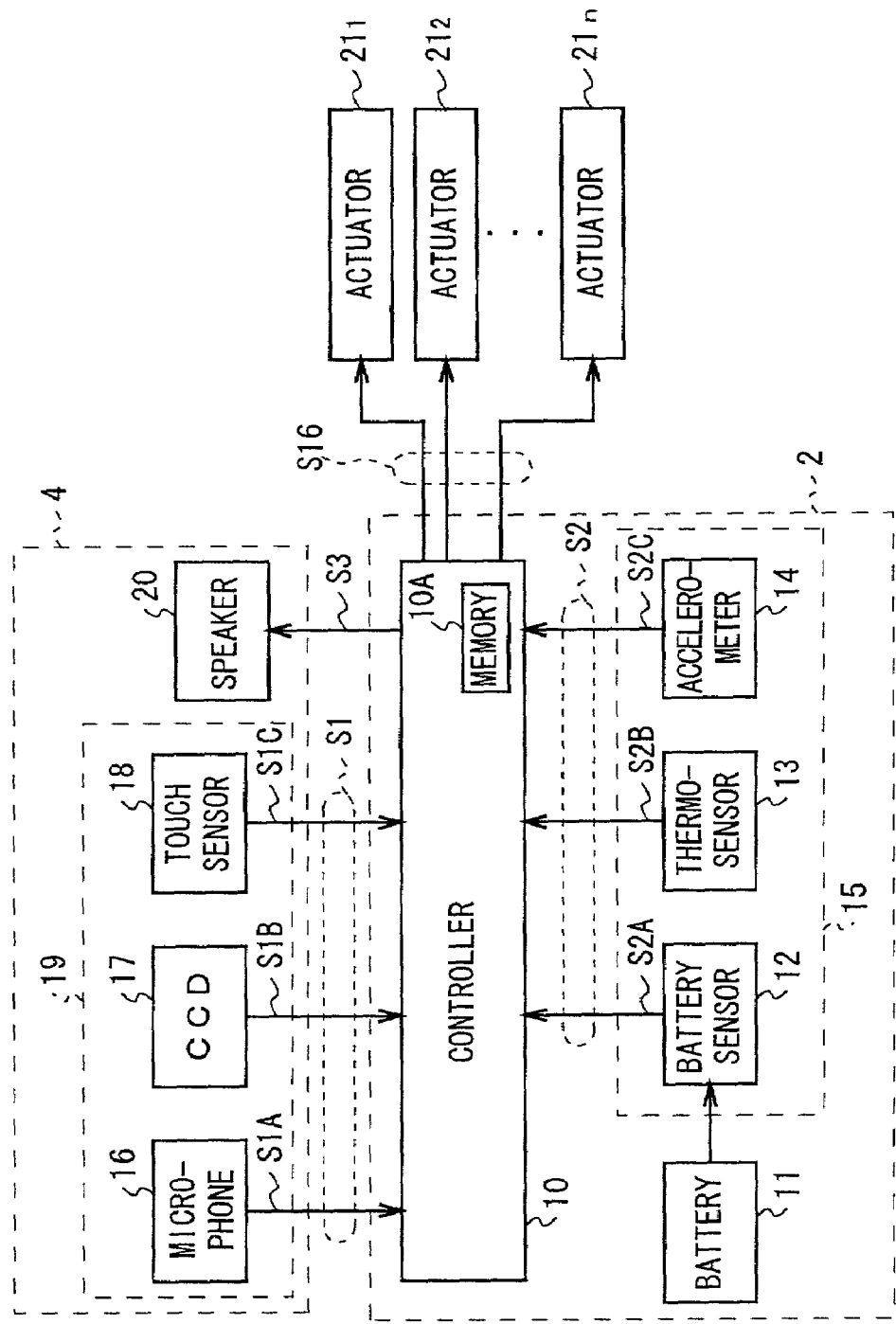
FIG. 2 is a block diagram showing the circuitry of the pet robot.

As shown in FIG. 2, in the body unit 2, a controller 10 for controlling the entire movement of the pet robot 1, a battery 11 being the power source of the pet robot 1, and an internal sensor part 15 composed of a battery sensor 12, a thermosensor 13 and an accelerometer 14 are stored.

Also, on the head unit 4, an external sensor part 19 composed of a microphone 16 corresponding to the "ears" of the pet robot 1, a charge coupled device (CCD) camera 17 corresponding to the "eyes" and a touch sensor 18, and a speaker 20 corresponding to the "mouth" are arranged at the fixed positions respectively.

Moreover, actuators $21_1$ to $21_n$ are respectively arranged on the arthro parts of the leg units 3A to 3D, on the joint parts between the leg units 3A to 3D and the body unit 2, on the joint part between the head unit 4 and the body unit 2, and on the joint part between the tail unit 5 and the body unit 2.

The microphone 16 of the external sensor part 19 collects the command sounds such as "walk" "down" or "run to the ball" which are given from a user as tonal scale through a sound commander which is not shown in the figure, and sends the obtained audio signal S1A to the controller 10. The CCD camera 17 images the surrounding situation, and sends the obtained video signal S1B to the controller 10.

As it is apparent from FIG. 1, the touch sensor 18 is provided on the top of the head unit 4. The touch sensor 18 detects the pressure received by physical approach such as "pat" or "tap" from the user, and sends the detected result to the controller 10 as the pressure detection signal S1C.

The battery sensor 12 of the internal sensor part 15 detects the remaining amount of energy in the battery 11, and sends the detected result to the controller 10 as the battery remaining amount detection signal S2A. The thermosensor 13 detects the internal temperature of the pet robot 1, and sends the detected result to the controller 10 as the temperature detection signal S2B. The accelerometer 14 detects the acceleration in three-axis directions (Z-axis direction, Y-axis direction and Z-axis direction), and sends the detected result to the controller 10 as the acceleration detection signal S2C.

The controller 10 judges the external and internal states and the presence of any command or any approach given from the user, based on the audio signal S1A, the video signal S1B and the pressure detection signal S1C given from the external sensor part 19 (hereinafter, these are referred to as external information signal S1 collectively), and based on the battery remaining amount detection signal S2A, the temperature detection signal S2B and the acceleration detection signal S2C given from the internal sensor part 15 (hereinafter, these are referred to as internal information signal S2 collectively).

Then, the controller 10 determines a following action, based on the judged result and the control program previously stored in the memory 10A. The controller 10 drives the necessary actuators $21_1$ to $21_n$ based on the determined result, so as to make the robot perform the action and movement such as shaking the head unit 4 up and down, right and left, moving the tail 5A of the tail unit 5, and driving the leg units 3A to 3D to make the robot walk.

Furthermore, at this time, the controller 10 generates the audio signal S3 if necessary to give this to the speaker 20, so that the sound on the basis of the audio signal S3 is output to the outside and a light emitting diode (LED) which is arranged at the position of the "eyes* of the pet robot 1 and which is not shown in the figure is flashed.

In this way, the pet robot 1 can autonomously act in accordance with the external and internal state, and in accordance with the presence of the user's command and approach.

(1-2) Growth Model of Pet Robot 1

Next, the growth model loaded in the pet robot 1 will be described.

The pet robot 1 changes its actions and movements as if a real animal "grows up" in accordance with the history of operation input such as the user's approach and the command using a sound commander and in accordance with the history of own actions and movements.

Figure 3:
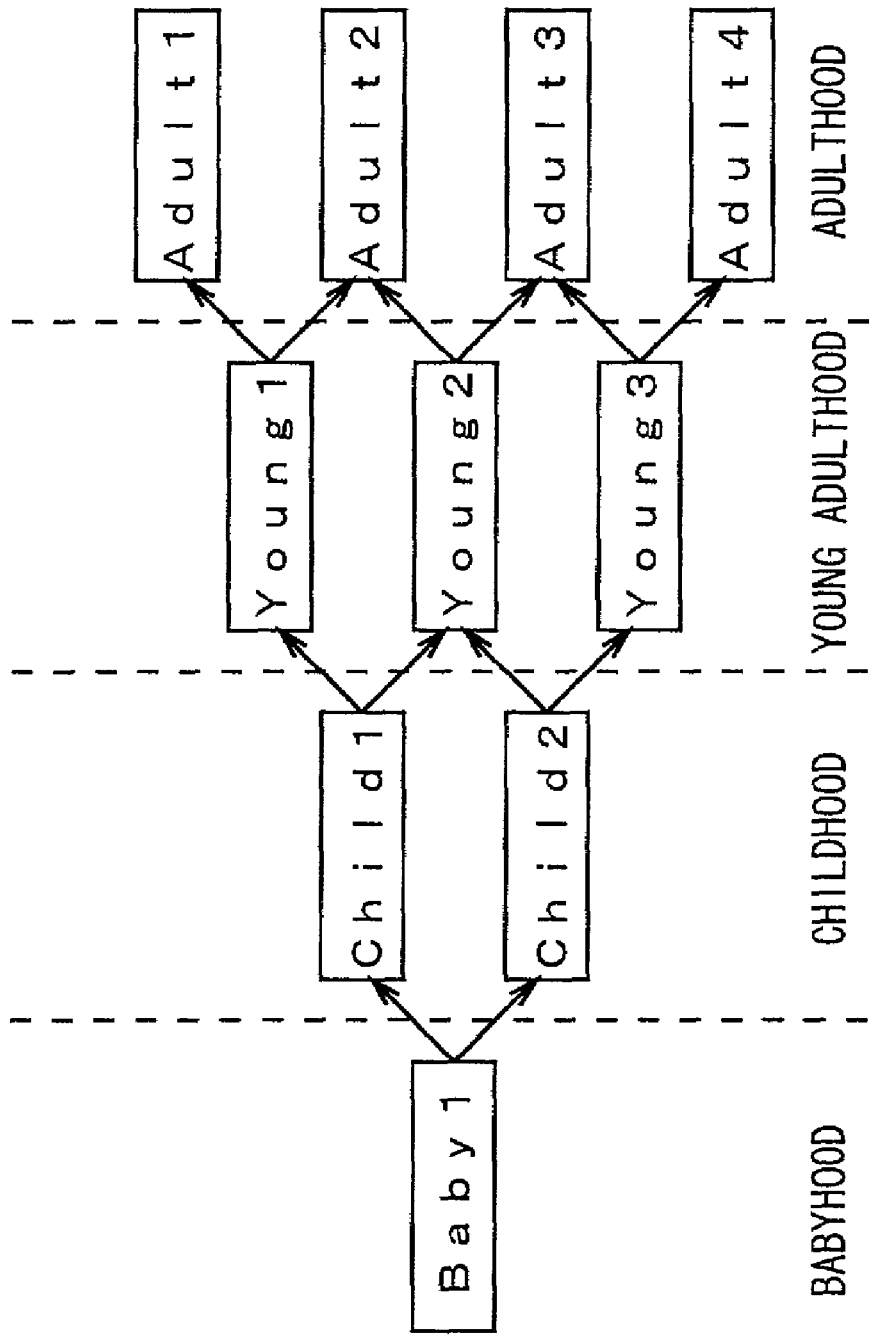
FIG. 3 is a conceptual diagram showing the growth model.

More specifically, as shown in FIG. 3, in the pet robot 1, four "growth stages" "babyhood" "childhood" "young adulthood" and "adulthood" are provided as growth process. In the memory 10A of the controller 10, the action and movement models composed of various control parameters and control programs which are the base of the actions and movements relating to four items: "walking state" "motion" "action" and "sound (sing)" are previously stored for each "growth stage".

Then, the controller 10 controls the actuators $21_1$ to $21_n$ and the audio output in accordance with the action and movement model of "babyhood" at an early stage, so that the robot toddles by walking it with short steps with regard to the "walking state" so that the robot moves "simply" like "walking" "standing up" and "sleeping" with regard to the "motion" so that the robot acts "flatly" by repeating the same action with regard to the "action" so that the robot sings "weakly and shortly" by reducing the gain of the audio signal S3 with regard to the "sound".

Furthermore, at this time, the controller 10 always keeps watch on and counts up the occurrence of the command inputting using a sound commander, the occurrence of the training comprising the sensor inputting through the touch sensor 18 which corresponds to "pat" and "tap" and the number of times of success in the predetermined action and movement, the occurrence of the sensor inputting through the touch sensor 18 which does not correspond to "pat" and "tap" and a plurality of elements relating to the predetermined "growth" of the prescribed action and movement such as "playing with the ball" (hereinafter, this is referred to as growth element).

Then, based on the cumulative frequency of the growth elements, the controller 10 changes the action and movement model to be used into the action and movement model of "childhood" whose growth level is higher than that of "babyhood" when the total value of cumulative frequency of each growth elements (hereinafter, this is referred to as the total experience value of the growth element) exceeds a preset threshold.

Then, the controller 10 controls the actuators $21_1$ to $21_n$ and the audio output from the speaker 20 in accordance with the action and movement model of "childhood" so that the robot walks "little more stably" by running up the rotational frequency of the actuators $21_1$ to $21_n$ with regard to the "walking state" so that the robot moves "with a little higher-level and a little more complicatedly" by increasing the number of movements with regard to the "motion" so that the robot acts "purposefully" in such a way that the previous action is referred to determine the next Inaction with regard to the "action" so that the robot sings "little longer and louder" by extending the length of the audio signal and by uprating the gain with regard to the "sound".

Furthermore, the controller 10, similarly to this, successively changes the action and movement model into the action and movement model of "young adulthood" or "adulthood" whose growth level is higher, whenever the total experience value of the growth element exceeds a threshold preset correspondingly to "young adulthood" or "adulthood". The controller 10 gradually increase the rotational speed of the actuators $21_1$ to $21_n$ and the length or gain of the audio signal S3 given to the speaker 20 in accordance with the action and movement model, and changes the rotational amount of the actuators $21_1$ to $21_n$ when one movement is performed.

As a result, as the pet robot 1 steps up "the growth stage" (that is, changes from "babyhood" into "childhood" from "childhood" into "young adulthood" and "young adulthood" into "adulthood", the pet robot 1 stepwise changes the "walking state" from "toddling" into "walking stably" changes the "motion" from "simply" into "with higher-level and complicatedly" changes the "action" from "flatly" into "purposefully" and changes the "sound" from "weakly and shortly" into "longer and louder".

In this way, the pet robot 1 "grows up" at four stages, "babyhood" "childhood" "young adulthood" and "adulthood" in accordance with the input from the outside and the history of its own actions and movements.

Note that as is apparent from FIG. 3, a plurality of action and movement models are respectively prepared for respective "growth stages" "babyhood" "childhood" "young adulthood" and "adulthood".

Practically, as the action and movement models of "childhood" the action and movement model which has rough and fast movement and acts and moves with "rough" temperament,(Child 1) and the action and movement model which has smooth and slow movement and acts and moves with "easy" temperament (Child 2) are prepared.

Also, as the action and movement models of "young adulthood" the action and movement model which has rougher and faster movement than that of the "rough" temperament of "childhood" and acts and moves with "irritated" temperament (Young 1), the action and movement model which has smoother and slower movement than that of the irritated temperament and acts and moves with "normal" temperament (Young 2), and the action and movement model which has further slower movement and less action amount than that of the normal temperament and acts and moves with "easy" temperament (Young 3) are prepared.

Also, as the action and movement models of "adulthood" the action and movement model which has rougher and faster movement than that of the "irritated" temperament of "young adulthood" and which is difficult to move in accordance with the user's command and acts and moves with "aggressive" temperament (Adult 1), the action and movement model which has smoother and slower movement than that of the aggressive temperament and which is easy to move in accordance with the user's command and acts and moves with "roughish" temperament (Adult 2), the action and movement model which has smoother and slower movement and less action amount than that of the roughish temperament and which can not fail to move in accordance with the user's command and acts and moves with "wildly gentle" temperament (Adult 3), and the action and movement model which has further slower movement and less action amount than that of the mildly gentle temperament and which can not fail to act in accordance with the user's command and acts and moves with "gentle" temperament (Adult 4) are prepared.

Then, when stepping up "the growth stage" the controller 10 selects one action and movement model among from the action and movement models of the next "growth stage" based on the cumulative frequency of the growth element, and changes the action and movement model to be used into the selected action and movement model.

In this case, when the "growth stage" proceeds to the next stage at and after the "childhood" stage, the action and movement model of the next "growth stage" which can succeed from the action and movement model of the current "growth stage" is prescribed, and it can succeed only between the action and movement models united by arrows in FIG. 3. Accordingly, if the action and movement model which "roughly" acts and moves (Child 1) is selected at the "childhood" is can not proceed to the action and movement model which "gently" acts and moves (Young 3) at the "young adulthood".

In this way, the pet robot 1, as if a real animal forms his character according to a breeding method, changes his "character" in connection with its "growth" in accordance with the input history of user's approach and command and in accordance with the history of his own actions and movements.

(2) Processing by Controller 10

Next, the specific processing of the controller 10 in the pet robot 1 will be described.

Figure 4:
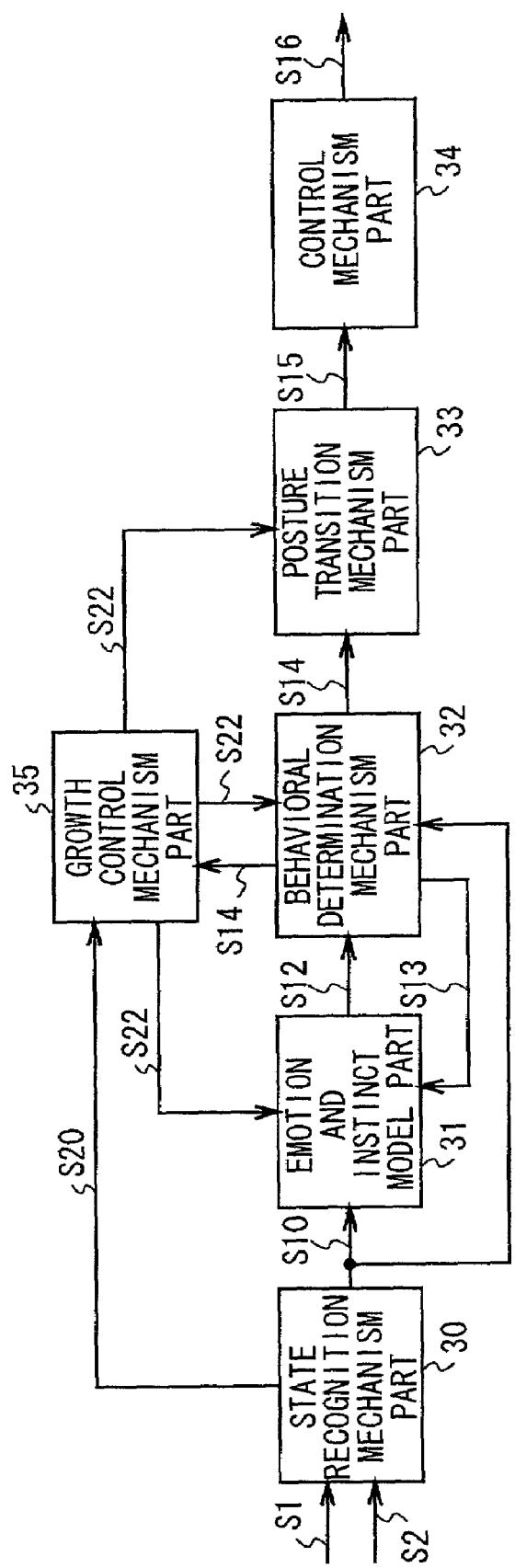
FIG. 4 is a block diagram for explaining the processing of a controller.

As shown in FIG. 4, the processing contents of the controller 10 is functionally classified into: a state recognition mechanism part 30 for recognizing the external and internal states; an emotion and instinct model part 31 for determining the state of emotion and instinct based on the recognized result of the state recognition mechanism part 30; a behavioral determination mechanism part 32 for determining the following action and movement based on the recognized result of the state recognition mechanism part 30 and based on the output of the emotion and instinct model part 31; an posture transition mechanism part 33 for planning a series of movements of the pet robot 1 in order to perform the action and movement determined by the behavioral determination mechanism part 32; a control mechanism part 34 for controlling the actuator $21_1$ to $21_n$ based on the action plan planned by the posture transition mechanism part 33; and a growth control mechanism part 35 for controlling the "growth" and "character" of the pet robot 1.

Hereinafter, the state recognition mechanism part 30, the emotion and instinct model part 31, the behavioral determination mechanism part 32, the posture transition mechanism part 33, the control mechanism part 34, and the growth control mechanism part 35 will be described in detail.

(2-1) Processing by State Recognition Mechanism Part 30

The state recognition mechanism part 30 recognizes a particular state based on the external information signal S1 given from the external sensor part 19 (FIG. 2) and the internal information signal S2 given from the internal sensor part 15, and gives the recognized result to the emotion and instinct model part 31 and the behavioral determination mechanism part 32 as state recognition information S10.

Practically, the state recognition mechanism part 30 always keeps watch on the audio signal S1A given from the microphone 16 of the external sensor part 19 (FIG. 2), and recognizes the given command when the same tonal scale spectrum as the command sound output from the sound commander in accordance with the command such as "walk" "down" and "run to the ball" is detected as a spectrum of the audio signal S1A. The state recognition mechanism part 30 gives the recognized result to the emotion and instinct model part 31 and the behavioral determination mechanism part 32.

Also, the state recognition mechanism part 30 always keeps watch on the video signal S1B given from the CCD camera 17 (FIG. 2), and recognizes that "where is a ball" or "where is the wall" when "red round thing" or "plane which is vertical for the ground and has a predetermined height" is detected within the image picture based on the video signal S1B. The state recognition mechanism part 30 gives the recognized result to the emotion and instinct model part 31 and the behavioral determination mechanism part 32.

Furthermore, the state recognition mechanism part 30 always keeps watch on the pressure detection signal S1C given from the touch sensor 18 (FIG. 2), and recognizes that "got a rap (I got an earful)" when brief (e.g., less than two seconds) pressure with a predetermined threshold and over is detected based on the pressure detection signal S1C, and recognizes that "got a pat (I am commended)" when long (e.g., two seconds and over) pressure less than a predetermined threshold is detected. The state recognition mechanism part 30 gives the recognized result to the emotion and instinct model part 31 and the behavioral determination mechanism part 32.

At the same time, the state recognition mechanism part 30 always keeps watch on the acceleration detection signal S2C given from the accelerometer 14 of the internal sensor part 15 (FIG. 2), and recognizes that "got a big shock" when the preset acceleration with a predetermined level and over is detected based on the acceleration signal S2C, and recognizes that fell down (from the desk, etc.)" when a larger acceleration corresponding to gravitational acceleration is detected. The state recognition mechanism part 30 gives the recognized result to the emotion and instinct model part 31 and the behavioral determination mechanism part 32.

Also, the state recognition mechanism part 30 always keeps watch on the temperature detection signal S2B given from the thermosensor 13 (FIG. 2), and recognizes that "the internal temperature has increased" when the temperature of a prescribed degree and over is detected based on the temperature detection signal S2B, and gives the recognized result to the emotion and instinct model part 31 and the behavioral determination mechanism part 32.

(2-2) Processing by Emotion and Instinct Model Part 31

Figure 5:
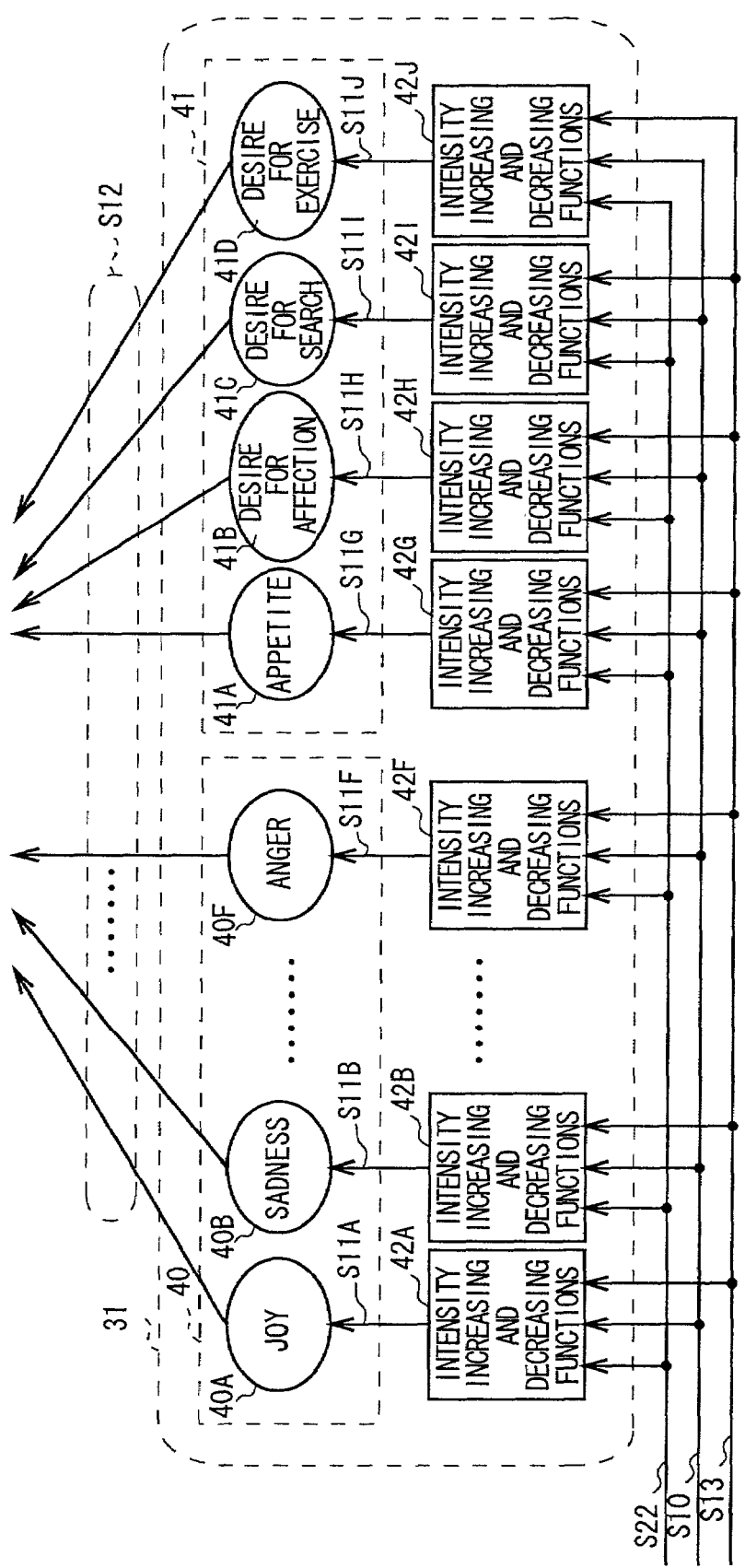
FIG. 5 is a conceptual diagram for explaining the data processing in an emotion and instinct model part.
Figure 6:
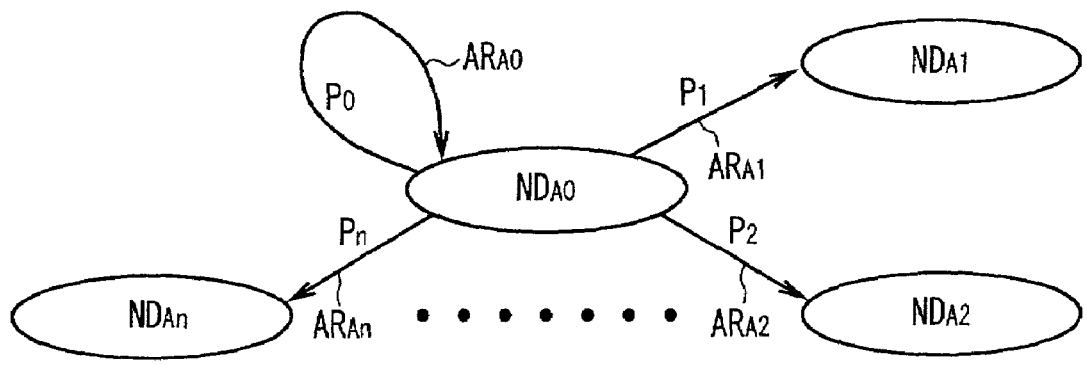
FIG. 6 is a conceptual diagram showing the probability automaton.

As shown in FIG. 5, the emotion and instinct model part 31 has: a basic feeling group 40 composed of feeling units 40A to 40F being the emotion models provided corresponding to six feelings, "joy" "sadness" "surprise" "fear" "aversion" and "anger" a basic desire group 41 composed of desire units 41A to 41D being the desire models provided corresponding to four desires, "appetite" "desire for affection" "desire for search" and "desire for exercise" and intensity increasing and decreasing functions 42A to 42H provided corresponding to the feeling units 40A to 40F and the desire units 41A to 41D.

The feeling units 40A to 40F respectively represents the degrees of corresponding feelings by the intensity from 0 level to 100 level for example, and ever-changes the intensity based on the intensity information S11A to S11F given from the corresponding intensity increasing and decreasing functions 42A to 42F.

The desire units 41A to 41D respectively represents the degrees of corresponding desires by the intensity from 0 level to 100 level similarly to the feeling units 40A to 40F, and ever-changes the intensity based on the intensity information S12G to S12F given from the corresponding intensity increasing and decreasing functions 42G to 42K.

Then, the emotion and instinct model part 31 determines the state of emotion by combining the intensity of the feeling units 40A to 40F, and at the same time, determines the state of instinct by combining the intensity of the desire units 41A to 41D. The emotion and instinct model part 31 outputs the determined states of emotion and instinct to the behavioral determination mechanism part 32 as an emotion and instinct state information S12.

Note that the intensity increasing and decreasing functions 42A to 42G are functions for generating and outputting the intensity information S11A to S11G to increase and decrease the intensity of the feeling units 40A to 40F and the desire units 41A to 41D as described above in accordance with the preset parameters, based on the state recognition information S10 which is given from the state recognition mechanism part 30 and based on the action information S13 representing the contents of the present or past action of the pet robot 1 itself which is given from the behavioral determination mechanism part 32 described later.

In this way, in the pet robot 1, the parameters of the intensity increasing and decreasing functions 42A to 42G are set to the values different for each action and movement model (Baby 1, Child 1, Child 2, Young 1 to Young 3, Adult 1 to Adult 4), so that the pet robot 1 can form it's character like "irritated" or "gentle".

(2-3) Processing by Behavioral Determination Mechanism Part 32

The behavioral determination mechanism part 32 has a plurality of behavioral models in the memory 10A, correspondingly to the action and movement models (Baby 1, Child 1, Child 2, Young 1 to Young 3, Adult 1 to Adult 4) respectively.

The behavioral determination mechanism part 32 determines the next action or movement based on the state recognition information 10 given from the state recognition mechanism part 30, based on the intensity of the feeling units 40A to 40F and the desire units 41A to 41D of the emotion and instinct model part 31, and based on the corresponding behavioral model. The behavioral determination mechanism part 32 then outputs the determined result to the posture transition mechanism part 33 and the growth control mechanism part 35 as a behavioral determination information S14.

In this case, as a method of determining the next action or movement, the behavioral determination mechanism part 32 uses an algorithm called probability automaton which determines at random that one node (state) $ND_{A0}$ proceeds to which nodes $ND_{A0}$ to $ND_{An}$, based on the transition probabilities $P_0$ to $P_n$ set to arcs $AR_{A0}$ to $AR_{An}$ connecting between the nodes $ND_{A0}$ to $ND_{An}$.

More specifically, a state transition table 50 as shown in FIG. 7 is stored as a behavioral model in the memory 10A for each node $ND_{A0}$ to $ND_{An}$. The behavioral determination mechanism part 32 determines the next action and movement based on the state transition table 50.

Here, in the state transition table 50, the input events (recognized results) being the transition condition in the node $ND_{A0}$ to $ND_{An}$ are listed in the order of descending priorities in the lines of "input events" and the further transition condition are listed in the corresponding lines in the columns "data names" and "data extents".

Accordingly, in the node ND100 defined at the state transition table 50 of FIG. 7, when the recognized result "the ball is detected (BALL)" is given, it is the condition for transition to another node that the "size (SIZE)" of the ball given together with the recognized result is "the extent between 0 to 1000 (0, 1000)" and when the recognized result "the obstacle is detected (OBSTACLE)" is given, it is the condition for transition to another node that the "distance (DISTANCE)" to the obstacle given together with the recognized result is "the extent between 0 to 100 (0, 100)".

The node $ND_{100}$ can transit to another node even if the recognized result is not input, when the intensity of the feeling units 40A to 40F of one of "joy" "surprise" or "sadness" is in "the extent between 50 to 100 (50, 100)" among from the intensity of the feeling units 40A to 40F and the desire units 41A to 41D of the emotion and instinct model part 31 which is periodically referred to by the behavioral determination mechanism part.

In the state transition table 50, the node names which can transit from the nodes $ND_{A0}$ to $ND_{An}$ are listed in the line of "node transited to" of "transition probabilities to another node" section, and the transition probabilities to other nodes $ND_{A0}$ to $ND_{An}$, which can transit when all conditions described in the columns of "input event names" "data values" and "data extents" are met, are described in the "output action" line in "the transition probabilities to another node" section. Note that the sum of the transition probabilities of respective lines in "the transition probabilities to another node" section is 100[%].

Accordingly, in the node NODE100 in this example, the behavioral model can transit to "node $NODE_{120}$ (node 120)" by "30[%]" probability, when the recognized result that "the ball is detected (BALL)" and "the size" of the ball is in "the extent between 0 to 1000 (0, 1000)" is given. At this time, the action or movement of "ACTION 1" is output.

Then, the behavioral models are so constructed that the nodes $ND_{A0}$ to $ND_{An}$ described as the state transition table 50 are connected severally.

Thus, when the state recognition information S10 is given from the state recognition mechanism part 30 or when a specified time has past after the last action was expressed, the behavioral determination mechanism part 32 uses the state transition table 50 of the corresponding nodes $ND_{A0}$ to $ND_{An}$ of the corresponding behavioral models stored in the memory 10A to determine at random the next action or movement (the action or movement described in the line of "output action", and outputs the determined result to the posture transition mechanism part 33 and the growth control mechanism part 35 as action command information S14.

(2-4) Processing by Posture Transition Mechanism Part 33

When the behavioral determination information S14 is given from the behavioral determination mechanism part 32, the posture transition mechanism part 33 plans a series of movements of the pet robot 1 in order to act and move based on the behavioral determination information S14, and outputs movement command information S15 based on the movement plan to the control mechanism part 34.

Figure 8:
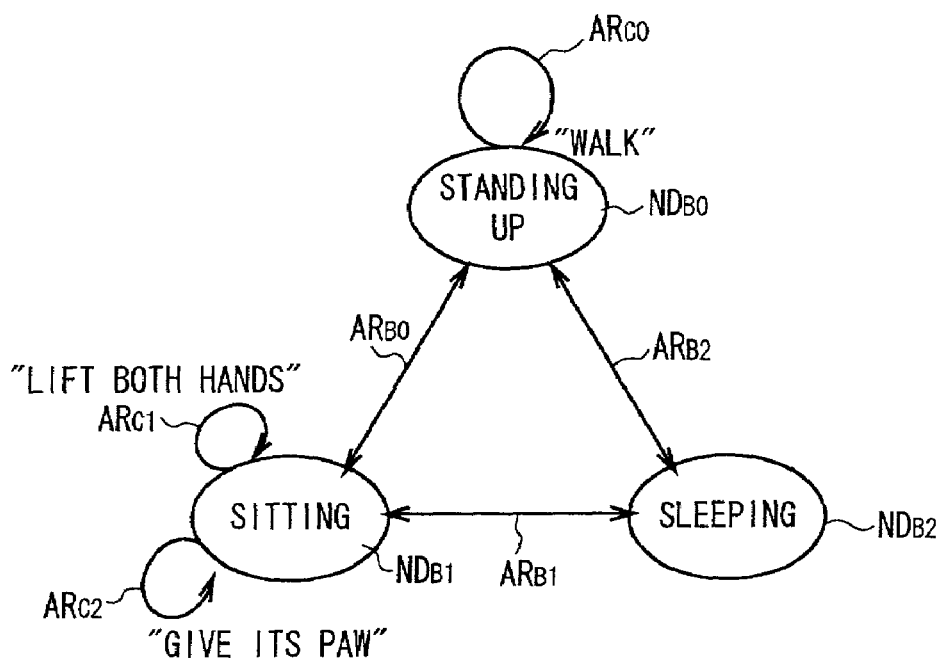
FIG. 8 is a conceptual diagram for explaining a directed graph.

In this case, as a method of arranging the movement plan, the posture transition mechanism part 33 uses a directed graph in which the attitudes which may be formed by the pet robot 1 shown in FIG. 8 are set as the nodes $ND_{B0}$ to $ND_{B2}$, the directed arcs $AR_{B0}$ to $AR_{B2}$ for representing the movement respectively connect between the nodes $ND_{B0}$ to $ND_{B2}$ which can transit each other, and the movement completing in one of the nodes $ND_{B0}$ to $ND_{B2}$ is expressed as the self movement arcs $AR_{C0}$ to $AR_{C2}$.

On this account, the file data that the starting attitude and finishing attitude of all movements formed by the pet robot 1 are stored in a database, that is the source of the directed graph (hereinafter, this is referred to as network definition file) are stored in the memory 10A, and the posture transition mechanism part 33 generates the directed graphs (not shown) for the entire body, for the head, for the legs, and for the tail based on the network definition file.

Then, when the action commands such as "standing up" "walk" "give its paw" "shake its head" and "move its tail" are given from the behavioral determination mechanism part 32 as the action command information S14, the posture transition mechanism part 33 uses the corresponding directed graph to search the route from the current node to the node corresponded to the specified attitude or to the directed arc or the self-movement arc corresponding to the specified movement, in accordance with the orientation of the directed arc. Then, the posture transition mechanism part 33 successively outputs, to the control mechanism part 34, the movement commands for sequentially making the pet robot 1 perform the movements corresponding to the directed arcs on the searched route as the movement command information S15.

Furthermore, when the action command for the head part, leg part, or tail part is given, the posture transition mechanism part 33 gives the attitude of the pet robot 1 back to one of the basic attitudes "standing" "sitting" "down" and "station" which is the attitude on the not-shown battery charger for charging the battery 11 (FIG. 2) in accordance with the action command, based on the directed graph for the entire body. Then, the posture transition mechanism part 33 outputs the movement command information S15 so as to transit the position of the head part, leg part, or tail part by using the corresponding directed graph for head part, leg part, or tail part.

(2-5) Processing by Control Mechanism Part 34

The control mechanism part 34 generates the control signal S16 based on the movement command information S15 given from the posture transition mechanism part 33, and drive-controls the actuators $21_1$ to $21_n$ based on the control signal S16, so as to make the pet robot 1 perform the specified action and movement.

(2-6) Processing by Growth Control Mechanism Part 35

To the growth control mechanism part 35, various states recognized based on the external information signal S1 and the internal information signal S2 are supplied from the state recognition mechanism part 30 as state recognition information S20. Note that in addition to the specific states informed to the emotion and instinct model part 31 and the behavioral determination mechanism part 32 as described above, the various states include the input through the touch sensor 18 which does not correspond to "get a pat" or "get a rap".

Figure 9:
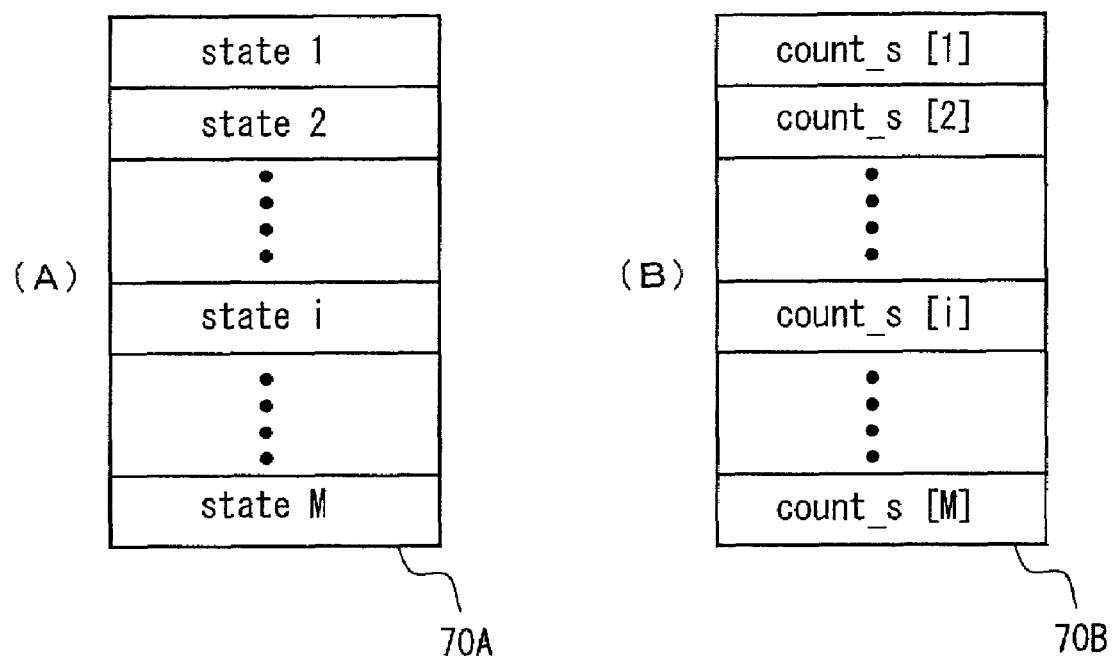
FIGS. 9A and 9B are conceptual diagrams showing the first growth element list and the first growth element counter table.

Furthermore, in the memory 10A, the growth control mechanism part 35 has a list 70A as shown in FIG. 9(A) (hereinafter, this is referred to as the first growth element list) in which among the various states based on the state recognition information S20 given from the state recognition mechanism part 30, the above-mentioned growth elements to be the reference elements when upgrading "the growth stage" are collectively listed, and a counter table 70B as shown in FIG. 9(B) (hereinafter, this is referred to as the first growth element counter table) for counting up the cumulative frequencies of the growth elements.

When the state recognition information S20 is given from the state recognition mechanism part 30, the growth control mechanism part 35 then judges on the basis of the first growth element list 70A whether or not the state obtained based on the state recognition information S20 is a growth element, and increases by one the corresponding count value (experience value) in the first growth element counter table 70B if the state is a growth element.

Figure 10:
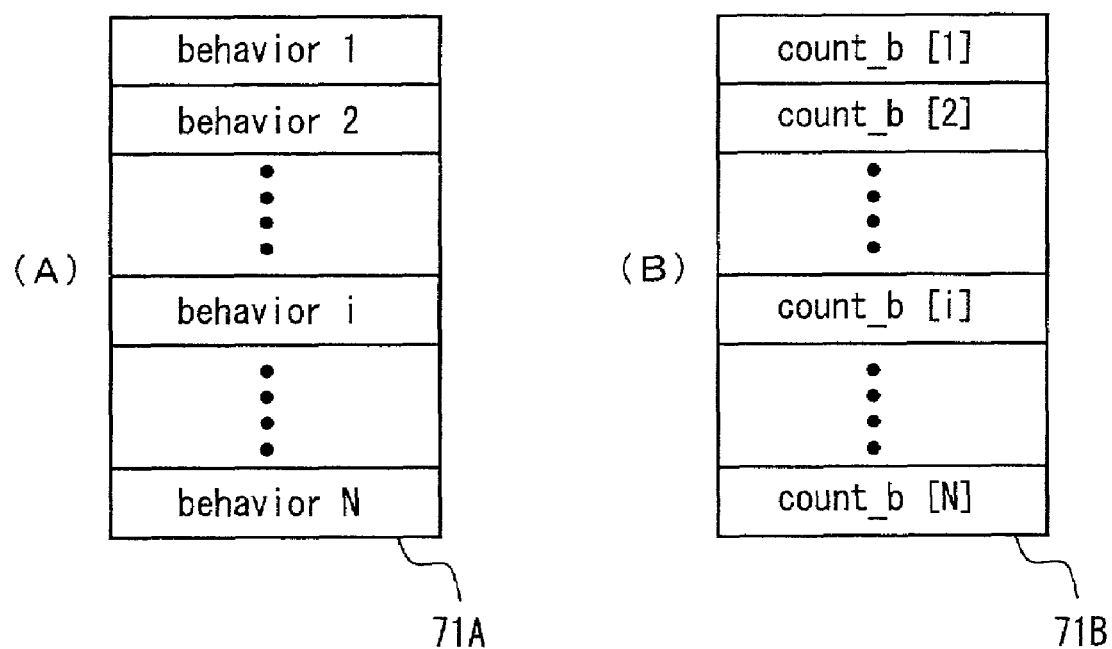
FIGS. 10A and 10B are conceptual diagrams showing the second growth element list and the second growth element counter table.

Furthermore, in the memory 10A, the growth control mechanism part 35 has a list 71A as shown in FIG. 10(A) (hereinafter, this is referred to as the second growth element list) in which among the actions obtained based on the action command information S14 given from the behavioral determination mechanism part 32 as described above, the above-mentioned growth elements to be the reference elements when upgrading "the growth stage" are collectively listed, and a counter table 71B as shown in FIG. 10(B) (hereinafter, this is referred to as the second growth element counter table) for counting up the cumulative frequencies of the growth elements.

When the action command information S14 is given from the behavioral determination mechanism part 32, the growth control mechanism part 35 then judges on the basis of the second growth element list 71A whether or not the action or movement obtained based on the action command information S14 is a growth element, and increases by one the corresponding count value (experience value) in the second growth element counter table 71B if the action is a growth element.

In the case where the growth control mechanism part 35 increases the count value in the first or second growth element counter table 70B or 71B as described above, it increases by one the count value of a counter (hereinafter, this is referred to as growth total experience value counter) for judging whether or not "the growth stage" is upgraded, which is prepared in addition to the first and second growth element counter tables 70B, 71B, and then judges whether or not the count value of the growth total experience value counter goes up to the count value preset as the completion condition of the current "growth stage".

When the count value of the growth total experience value counter goes up to the count value preset as the completion condition of the current "growth stage", the growth control mechanism part 35 determines whether or not the action and movement model changes into which action and movement model of the next "growth stage" based on the count value of the first and second growth element counter table 70B, 71B, and notifies the emotion and instinct model part 31, the behavioral determination mechanism part 32, and the posture transition mechanism part 33 of the determined result as change command information S22.

As a result, the emotion and instinct model part 31 changes the parameters of the intensity increasing and decreasing functions 42A to 42G described above in FIG. 5 into the value of the specified action and movement model based on the change command information S22. The behavioral determination mechanism part 32 changes the behavioral model to be used into the specified action and movement model based on the change command information S22. The posture transition mechanism part 33 changes, based on the change command information S22, the setting in such a way that the directed arc or the self-movement arc of the specified action and movement model is selected when one of the directed arc or the self movement arc has to be selected among from the directed arcs or the self movement arcs corresponding to a plurality of action and movement models.

Note that it is apparent from this, the action and movement model is composed of: the parameter values of the intensity increasing and decreasing functions 42A to 42G in the emotion and instinct model part 31 corresponding to the "character" at the "growth stage" the behavioral model in the behavioral determination mechanism part 32; the directed arc or the self movement arc in the posture transition mechanism part 33; and so on.

In this way, the growth control mechanism part 35 controls "growth" in accordance with the operation input history of user's approach and of the command using the sound commander and in accordance with the self action and movement history.

Figure 11:
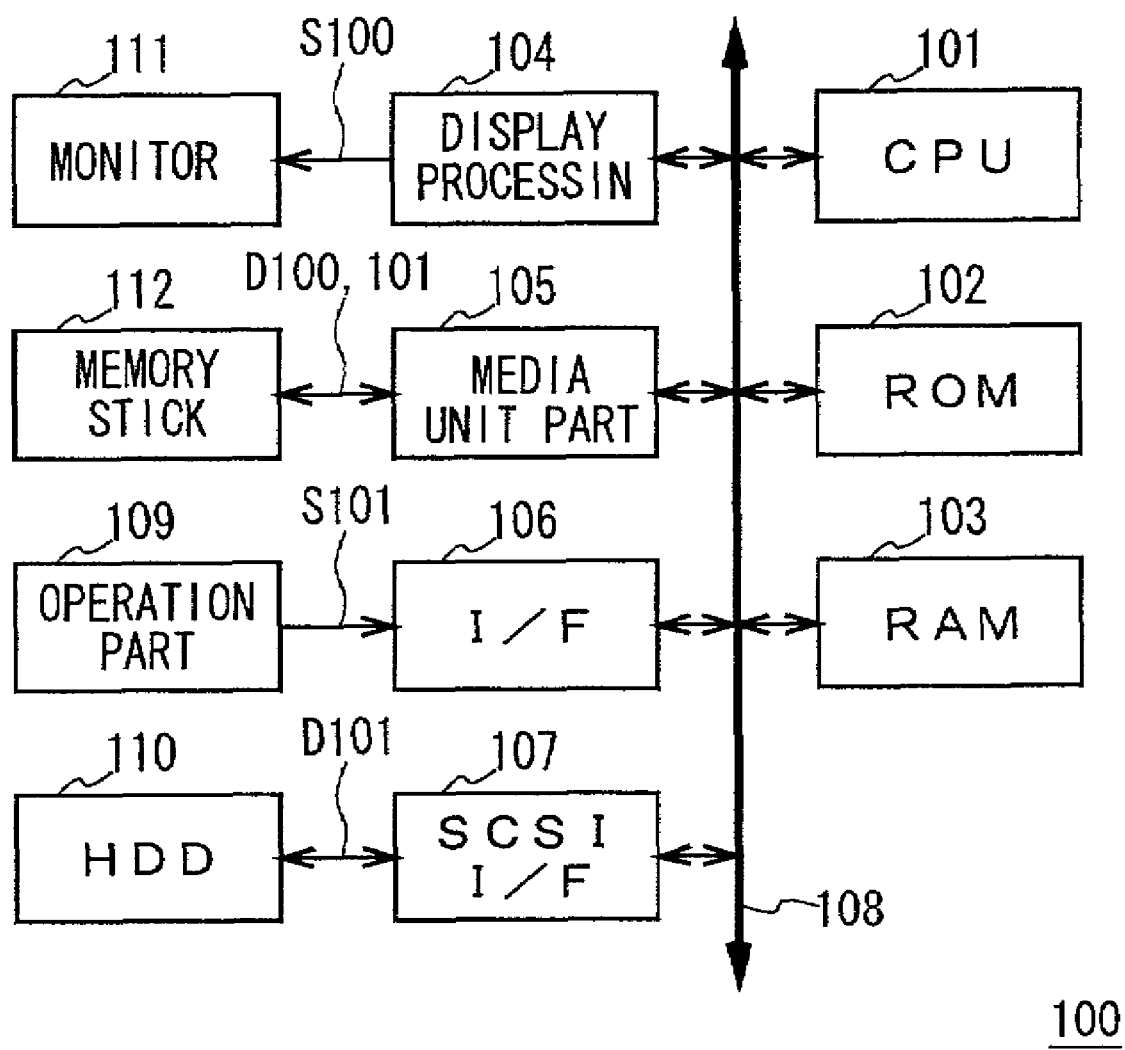
FIG. 11 is a block diagram showing the configuration of the editing apparatus according to this embodiment.

(3) Editing Apparatus According to this Embodiment (3-1) Configuration of Editing Apparatus Referring to FIG. 11, a reference numeral 100 shows an editing apparatus according to this embodiment, and is so constructed that a central processing unit (CPU) 101, a read only memory (ROM) 102, a random access memory (RAM) 103, a display processing circuit 104, a media unit part 105, an interface circuit 106, and a small computer system interface (SCSI) interface circuit 107 are connected one another through a CPU bus 108. The editing apparatus 100 is connected to an operation part 109 comprising a keyboard, a mouse, and so on through the interface circuit 107, and is connected to a hard disk device 110 through the SCSI interface circuit 107.

The display processing circuit 104 is connected to a monitor 111. A memory stick 112 being a semiconductor memory is inserted into the media unit part 105 so as to write/read information in/from the inserted memory stick 112 by a driver which is not shown in the figure in the media unit part 105.

In this case, the CPU 101 reads the application program stored in the ROM 102 to the RAM 103, and reads the video data in the ROM 102 based on the application program to give this to the monitor 111 through the display processing circuit 104 as the video signal S100. Thereby, the CPU 101 displays the initial screen (not shown) on the basis of the video data on the display part which is not shown of the monitor 111.

When the memory stick 112 is inserted into the corresponding media unit part 105 by a user in accordance with the initial screen displayed on the display part of the monitor 111, the CPU 101 reads various information D100 of the pet robot 1 preset in the memory stick 112, and reads the corresponding video data from the ROM 102 based on the various information D100, so as to display a graphical user interface (GUI) screen for editing the program of the growth and/or behavioral model of the pet robot 1 described later based on the video data, on the display part of the monitor 111.

In the state where the GUI screen is being displayed on the monitor 111, the CPU 101 superimposingly displays through the display processing circuit 104 the screen operated in accordance with the command S101 given from the operation part 109 through the interface circuit 106 by the user and the numerals or characters input from the operation part 109 through the interface circuit 106 on the GUI screen being displayed on the display part of the monitor 111.

The CPU 101 then sequentially edits the growth and behavioral model of the pet robot 1 in accordance with the user's operation. Thereafter, the CPU 101 backs up the obtained edited result as edit data D101 in the hard disk device 110 through the SCSI interface circuit 107, and stores the edit data D101 in the inserted memory stick 112 through the driver of the media unit part 105.

In this way, the editing apparatus 100 can edit the program of the growth and/or behavioral model of the pet robot 1 preset in the memory stick 112 inserted into the media unit part 105, in accordance with the user's preference.

(3-2) Structure of GUI Screen Displayed on Monitor 111

Figure 12:
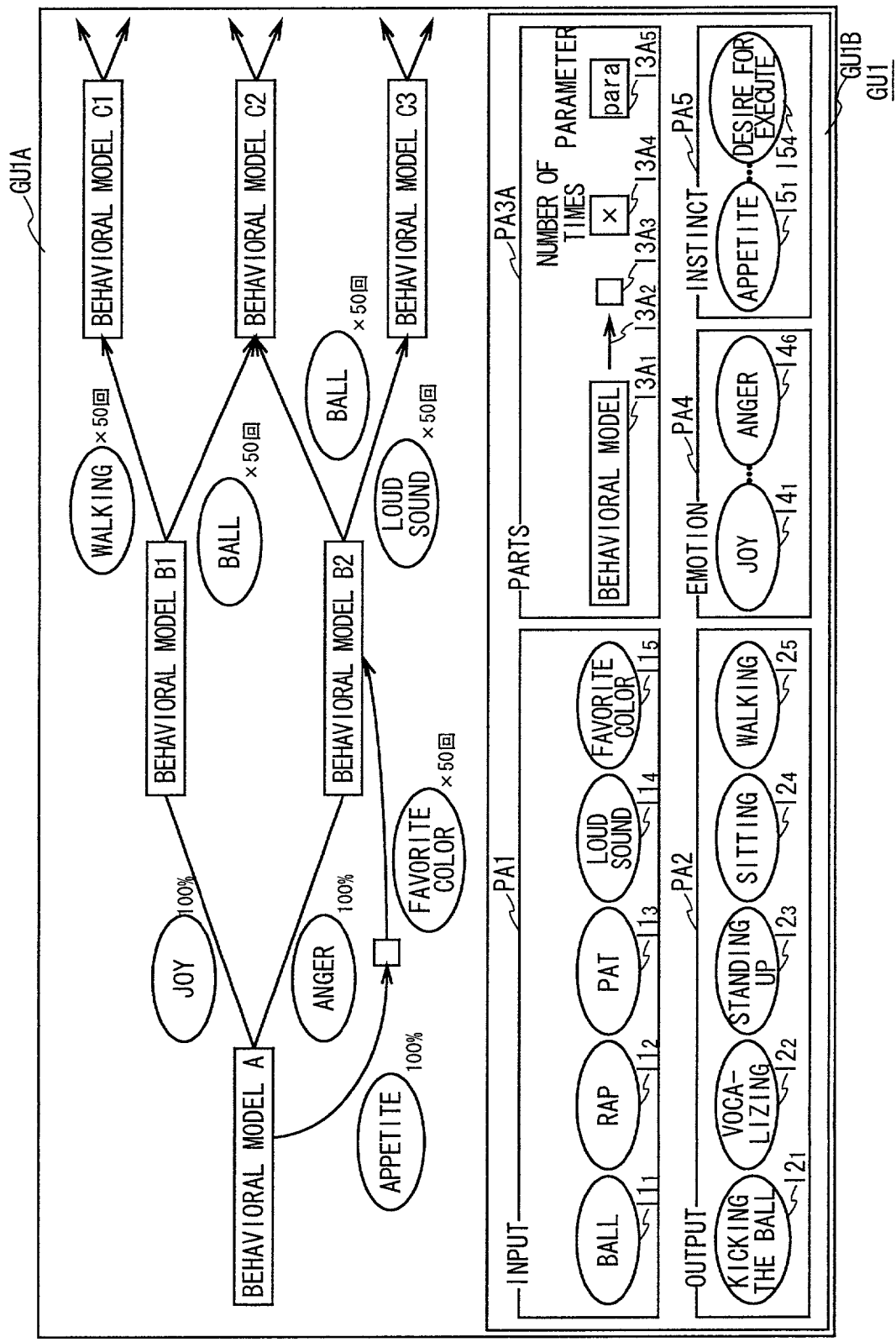
FIG. 12 is a conceptual diagram showing the growth model edit screen.

Among the GUI screens displayed on the display part of the monitor 111 actually, the growth model edit screen GU1 which is a graph shown in FIG. 12 is composed of: a growth model display area GU1A for displaying the growth model comprising the behavioral model of "babyhood" (behavioral model A), the behavioral models of "childhood" (behavioral models B1, B2), and the behavioral models of "young adulthood" (behavioral models C1, C2, C3) of the pet robot 1 stored in the memory stick 112; and an item display area GU1B comprising a plurality of types of edit items PA1, PA2, PA3A, PA4 and PA5 for editing the growth model of the growth model display area GU1A.

The various edit items PA1 to PA5 of the item display area GU1B are: icons $I1_1$ to $I1_5$ corresponding to the command given by a user to the pet robot 1 (FIG. 1) and the own action of the pet robot 1; icons $I2_1$ to $I2_5$ corresponding to the action and movement of the pet robot 1 in response to the icons $I1_1$ to $I1_5$; icons $I3A_1$ to $I3A_5$ corresponding to the parts for forming this growth model; and icons $I4_1$ to $I4_6$ and icons $I5_1$ to $I5_4$ corresponding to the emotion and instinct of the pet robot 1.

The growth model of the growth model display area GU1A on the growth model edit screen GU1 is operated by using a desired icon in the item display area GU1B which is selected by a user, so as to edit the growth model as follows. In the behavioral model A of "babyhood" when the emotion of "joy" of the pet robot 1 reaches 100[%], the "growth stage" of the pet robot 1 proceeds to the behavioral model B1 of "childhood". When the emotion of "anger" reaches 100[%], the "growth stage" of the pet robot 1 proceeds to the behavioral model B2 of "childhood". When the instinct of "appetite" reaches 100[%] and if the pet robot 1 sees "favorite color" fifty times here, the "growth stage" of the pet robot 1 proceeds to the behavioral model B2 of "childhood" through the intermediary node (mark □).

Moreover, in the behavioral model B1 of "childhood", the behavioral model can be edited as follows. When the pet robot 1 performs the action "walking" fifty times, "the growth stage" of the pet robot 1 proceeds to the behavioral model C1 of "young adulthood" and when the pet robot 1 performs the action "playing with the ball" fifty times, "the growth stage" of the pet robot 1 proceeds to the behavioral model C2 of "young adulthood". In the behavioral model B2 of "childhood", the growth model can be edited as follows. When the pet robot 1 performs the action "playing with the ball" fifty times, "the growth stage" of the pet robot 1 proceeds to the behavioral model C2 of "young adulthood" and when the pet robot 1 listens to "loud sound" fifty times, "the growth stage" of the pet robot 1 proceeds to the behavioral model C3 of "young adulthood".

In this way, in the editing apparatus 100, the growth model edit screen GU1 displayed on the monitor 111 is operated by a user, so that the program of the growth model of the pet robot 1 can be edited according to user's taste.

Figure 13:
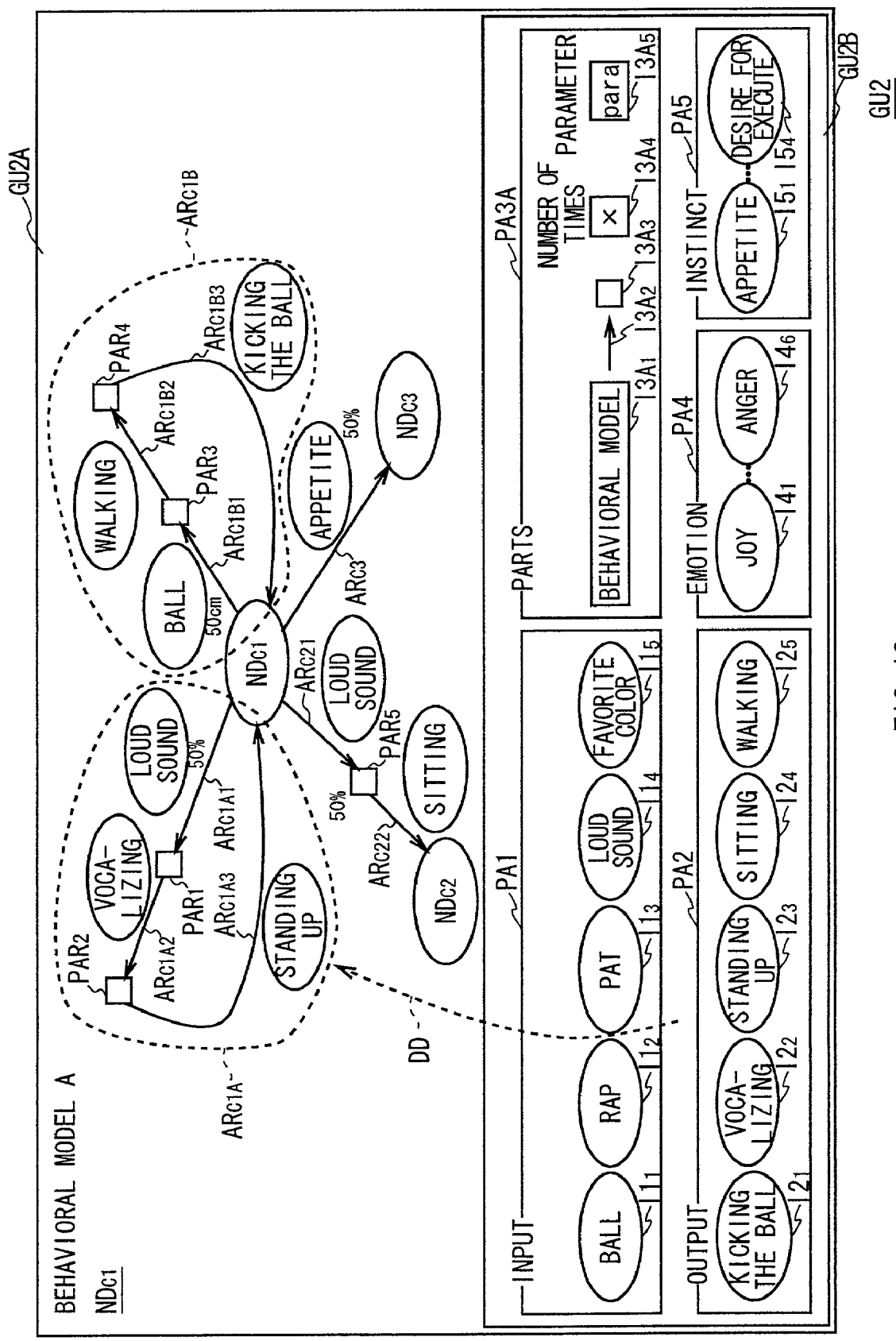
FIG. 13 is a conceptual diagram showing the behavioral model edit screen.
Figure 14:
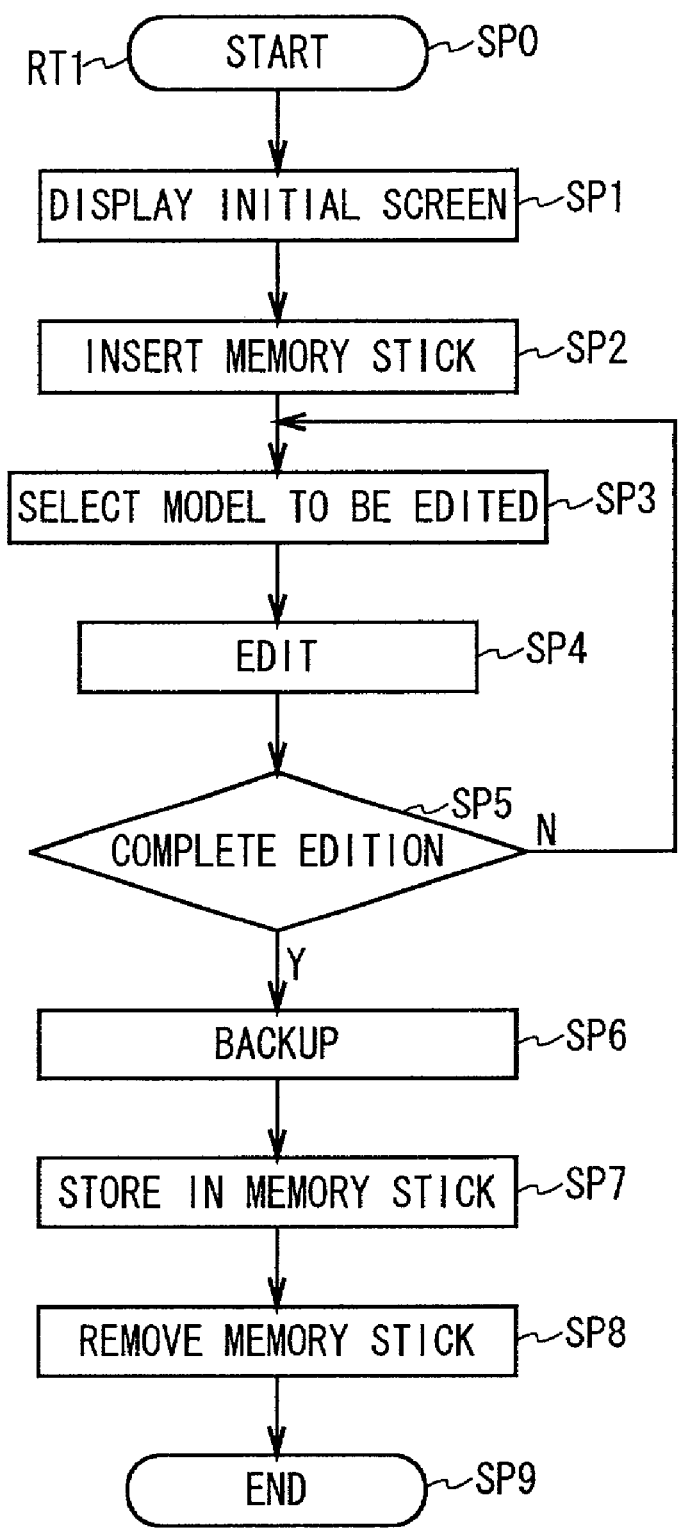
FIG. 14 is a flowchart showing the editing procedure.

As shown in FIG. 13, the behavioral model edit screen GU2 which is a graph displayed on the display part of the monitor 111 is composed of: the edition area GU2A for displaying a part of the behavioral model A selected by a user among from the behavioral models A, B1, B2, C1 to C3 of the pet robot 1; and an item display area GU2B comprising a plurality of types of edit items PA1, PA2, PA3B, PA4 and PA5 for editing a part of the behavioral model of the edition area GU2A mostly same as the above-mentioned item display area GU1B.

The edit item PA3B among the edit items PA1 to PA5 of the item display area GU2B is composed of icons $I3B_1$ to $I3B_x$ corresponding to the parts for forming the behavioral model A selected by the user.

The behavioral model of the edition area GU2A on the behavioral model edit screen GU2 is operated by using a desired icon in the item display area GU2B which is selected by a user, so as to edit the action of the self movement arc $AR_{C1A}$ comprising the directed arcs $AR_{C1A1}$ to $AR_{C1A3}$ which are enclosed with a broken circle as follows. In the node $ND_{C1}$ of the behavioral model A, when the pet robot 1 listen to "loud sound" the behavioral model goes to the direction shown by the directed arc $AR_{C1A1}$ at the transition probability of 50[%] to proceed to the intermediary node (mark □) $PAR_1$, and the after, the action "vocalizing" is performed to go to the direction shown by the directed arc $AR_{C1A21}$ and the action "standing up" is performed through the intermediary mode $PAR_2$ to go to the direction shown by the directed arc $AR_{C1A3}$.

Also, in the node $ND_{C1}$ of the behavioral model A, when there is "the ball" at the position within 50 [cm] from the pet robot 1, the behavioral model goes to the direction shown by the directed arc $AR_{C1B1}$ to proceed to the intermediary node $PAR_3$, and thereafter, the action "walking" is performed to go to the direction shown by the directed arc $ARC_{C1B2}$ and the action "kicking the ball" is performed through the intermediary mode $PAR_4$ to go to the direction shown by the directed arc $AR_{C1B3}$.

Similarly, the behavioral model can be edited as follows. In the node $ND_{C1}$ of the behavioral model A, when the pet robot 1 listens to "loud sound" the behavioral model goes to the direction shown by the directed arc $AR_{C21}$ at the transition probability of 50[%] and the pet robot 1 performs the action "sitting" through the intermediary mode $PAR_5$ to proceed to the node $ND_{C2}$. In the node $ND_{C1}$ of the behavioral model A, when the instinct of "appetite" of the pet robot 1 reaches 50[%], the behavioral model proceeds to the node $ND_{C3}$.

In this connection, the icon is selectively moved to the desired part among the behavioral models of the edition area GU2A from the item display area GU2B by the user's drag-and-drop operation. At this time, the icon can be selected again and again.

In this way, in the editing apparatus 100, the behavioral model edit screen GU2 displayed on the monitor 111 is operated by a user, so that the program of the behavioral model of the pet robot 1 can be edited in accordance with the user's taste.

(3-3) Edit Procedure by CPU 101

Here, the CPU 101 of the editing apparatus 100 practically executes the processing for editing the program of the growth and/or behavioral model of the above-mentioned pet robot 1 in accordance with the edit procedure RT1 shown in FIG. 12, when a user turns on power.

More specifically, when the user turns on power, the CPU 101 starts the edit procedure RT1 at step SP0, and at the following step SP1, displays the message "please insert a memory stick" on the display part of the monitor 111 as an initial screen (not shown).

Thereafter, when the user inserts the memory stick 112 into the media unit part 105 of the editing apparatus 100, the CPU 101 proceeds to step SP2 to read out preset various information D100 of the pet robot 1 from the memory stick 112, and at the same time, reads out the corresponding video data based on this from the ROM 102 to display on the display part of the monitor 111 the growth model edit screens GU1, GU2 (FIG. 12, FIG. 13) for editing the growth and behavioral model of the pet robot 1 based on the video data.

Then, when a processing proceeds to step SP3 and the user selects the edition of the growth model on the growth model edit screen GU1 being displayed on the monitor 111, the CPU 101 executes the edition of the growth model at the next step SP4. When the user selects the desired behavioral model on the growth model edit screen GU1 at step SP3, the CPU 101 switches the screen displayed on the monitor 111 into the behavioral model edit screen GU2 corresponding to the selected behavioral model, and proceeds to the next step SP4 to execute the edition of the selected behavioral model.

At step SP4, the growth model edit screen GU1 or GU2 being displayed on the monitor 111 is operated by the user through the operation part 109, so that the CPU 101 edits the growth or behavioral model of the pet robot 1 corresponding to the growth model edit screen GU1 or GU2.

The CPU 101 then proceeds to step SP5 to judge whether or not the edition of the growth or behavioral model of the pet robot 1 corresponding to the growth model edit screen GU1 or GU2 is completed. If the instruction to edit the other growth or behavioral model of the pet robot 1 is given from the user as a command S101 and a negative result is obtained, the CPU 101 returns to step SP3 where the growth model edit screen GUT is displayed on the monitor 111 again and makes the user select the desired growth or behavioral model.

Thereafter, the CPU 101 executes the following steps SP4 and SP5 similarly as described above, and repeats the loop of steps SP3-SP4-SP5-SP3 until an affirmative result is obtained at step SP5. In the course of time, when the instruction to complete the edition of the growth and behavioral model of the pet robot 1 is given from the user as a command S101 at step SP5 and an affirmative result is obtained, the CPU 101 proceeds to the next step SP6.

At step SP6, the CPU 101 backs up the edited result edited in this way in the hard disk device 110 through the SCSI interface circuit 107 as edit data D101, and proceeds to step SP7 to store the edit data D101 in the inserted memory stick 112 through the driver of the media unit part 105.

Then, after the CPU 101 stores the edit data D101 in the memory stick 112 at step SP7, it proceeds to step SP8 where the message "please remove the memory stick" (not shown) is displayed on the monitor 111. When the memory stick 112 is removed from the media unit part 105 by the user, the CPU 101 proceeds to the next step SP9 to terminate the edit procedure RT1.

In this way, in the edit procedure RT1, the program of the growth and/or behavioral model of the pet robot 1 preset in the memory stick 112 which is inserted into the media unit part 105 can be edited according to user's taste.

(4) Operation and Effects of This Embodiment

According to the above construction, the editing apparatus 100 is used to edit, according to user's taste, the program of the growth and/or behavioral model of the pet robot 1 which changes in stages in accordance with the user's approach to the pet robot 1 such as "tap" or "pat" the command given from the user to the pet robot 1 using the sound commander, and the action of the pet robot 1 such as playing with "the ball".

Accordingly, the editing apparatus 100 edits the character of the pet robot 1 to the character peculiar to the user, and makes the pet robot 1 perform the growth and actions peculiar to the user to provide the character peculiar to the user which is different from another pet robot. Therefore, the editing apparatus 100 can make the user not get tired of it, and give the further sense of affinity and feeling of satisfaction to the user.

According to the above constitution, since the program of the growth and/or behavioral model of the pet robot 1 is edited according to the user's taste so as to provide the character peculiar to the user in the pet robot 1, this can make the user not get tired of the pet robot 1, and give the further sense of affinity and feeling of satisfaction to the user. Therefore, the editing apparatus 100 which can remarkably improve the sense of amusement can be accomplished.

(5) Other Embodiments

The embodiments described above have dealt with the case where this invention is applied to the editing apparatus 100 for editing the action and movement model of the pet robot 1. However, this invention is not limited to this, but is applied to a conventional personal computer using a recording medium in which the application program for editing the action and movement model of the pet robot 1 in the editing apparatus 100 is recorded, and the action and movement model of the pet robot 1 can be edited with the personal computer. This invention is widely applicable to other various editing apparatuss.

Furthermore, the embodiments described above have dealt with the case where this invention is applied to the edition of the growth and behavioral model of the four-leg walking pet robot 1 constructed as shown in FIG. 1. However, this invention is not limited to this, but is widely applied to the editions of other robot apparatuss with various constructions. Also, this invention is applicable to the computer-graphics characters moving on the monitor screen, and so on.

In this case, the embodiments described above have dealt with the case where the action and/or movement forming means for forming the action or movement based on the action and movement model is composed of the controller 10, the actuators $21_1$ to $21_n$, the speaker 20, and the LED positioned at "the eyes" etc. However, this invention is not limited to this, but also other various constructions can be applied in accordance with the forms of the robot apparatus to which this invention is applied.

Furthermore, the embodiments described above have dealt with the case where the character and the growth level are changed based on both of the external input history and the self action and movement history. However, this invention is not limited to this, but also the character and the growth level of the pet robot 1 can be changed at a timing of other than "growth" based on the either of the external input history and the self action and movement history, or enjoining the element other than the external input history and the self action and movement history. Moreover, the character and the growth level can be changed based on either of the self action history and the movement history.

Furthermore, the embodiments described above have dealt with the case where the pet robot 1 is "grown up" in stages. However, this invention is not limited to this, but also the pet robot 1 can be "grown up" continuously by detecting the state of the growth element or by successively changing the value of the control parameter each time the action or movement of the growth element is performed.

Furthermore, the embodiments described above have dealt with the case where the pet robot 1 is "grown up" in four stages, "babyhood" "childhood" "young adulthood" and "adulthood". However, this invention is not limited to this, but also the number of "the growth stages" can be set to the number other than four.

Furthermore, the embodiments described above have dealt with the case where the history of the touch input through the touch sensor 18, of the imaging by the CCD camera 17, and of the command sound input using the sound commander are used as an input history from the external. However, this invention is not limited to this, but also the input history from the external can be used in addition to or other than these histories.

Furthermore, the embodiments described above have dealt with the case where a plurality of action and movement models are prepared for each "growth stage" after "childhood". However, this invention is not limited to this, but also a single action and movement model can be only prepared for each "growth stage".

Furthermore, the embodiments described above have dealt with the case where the items which are changed with "growth" are four, "walking state" "motion" "action" and "sound". However, this invention is not limited to this, but other items can be changed with "growth".

INDUSTRIAL CAPABILITY

This invention is applicable to an editing apparatus for editing the growth model and behavioral model of a pet robot, for example.

The invention claimed is:

1. An editing apparatus for editing a growth model of a pet robot; wherein the growth of said pet robot is determined in accordance with the growth model; comprising:
   removable storage means for storing edit data corresponding to the growth model of said pet robot;
   display means for graphically displaying a growth model edit screen based on the edit data stored in the removable storage means; and
   editing means for editing the edit data based on the displayed growth model edit screen, thereby editing the growth model of said pet robot.

2. A method of editing a growth model of a pet robot; wherein the growth of said pet robot is determined in accordance with the growth model; comprising the steps of:
   inserting a removable storage device containing edit data corresponding to the growth model of said pet robot;
   graphically displaying a growth model edit screen based on the edit data stored in the removable storage device;
   editing the edit data based on the displayed growth model edit screen, thereby editing the growth model of said pet robot; and
   storing the edited edit data in the removable storage device.

3. An editing apparatus for editing a behavioral model of a pet robot; wherein the actions of said pet robot are determined in accordance with the behavioral model; comprising:
   removable storage means for storing edit data corresponding to the behavioral model of said pet robot;
   display means for graphically displaying a behavioral model edit screen based on the edit data stored in the removable storage means; and
   editing means for editing the edit data based on the displayed behavioral model edit screen, thereby editing the behavioral model of said pet robot.

4. A method of editing a behavioral model of a pet robot; wherein the actions of said pet robot are determined in accordance with the behavioral model; comprising the steps of:
   inserting a removable storage device containing edit data corresponding to the behavioral model of said pet robot;
   graphically displaying a behavioral model edit screen based on the edit data stored in the removable storage device;
   editing the edit data based on the displayed behavioral model edit screen, thereby editing the behavioral model of said pet robot; and
   storing the edited edit data in the removable storage device.

* * * * *